US007937341B2

(12) United States Patent  
Gabarre et al.

(10) Patent No.: US 7,937,341 B2  
(45) Date of Patent: May 3, 2011

(54) METHOD FOR THE AUTOMATIC SEQUENCING OF THE SPECIFICATIONS OF A COMPUTER, ESPECIALLY FOR AIRCRAFT

(75) Inventors: Gilles Gabarre, Du Touch (FR); Guillaume Himbert, Colomiers (FR)

(73) Assignee: Airbus France, Toulouse (FR)

( * ) Notice: Subject to any disclaimer, the term of this patent is extended or adjusted under 35 U.S.C. 154(b) by 1257 days.

(21) Appl. No.: 11/492,653

(22) Filed: Jul. 25, 2006

(65) Prior Publication Data

US 2007/0079169 A1    Apr. 5, 2007

(30) Foreign Application Priority Data

Jul. 29, 2005 (FR) ..................................... 05 52384

(51) Int. Cl.
- *G06F 15/18* (2006.01)
- *G06F 17/00* (2006.01)
- *G06F 9/46* (2006.01)
- *G06N 5/00* (2006.01)

(52) U.S. Cl. ............................. 706/14; 706/45; 718/105

(58) Field of Classification Search .................... 706/10, 706/12, 19, 45, 14; 709/12, 62, 201–203; 718/102, 104, 105

See application file for complete search history.

(56) References Cited

U.S. PATENT DOCUMENTS

| 5,826,080 | A | 10/1998 | Dworzecki |
| 6,086,617 | A * | 7/2000 | Waldon et al. ................... 706/46 |
| 6,260,058 | B1 | 7/2001 | Hoenninger et al. |
| 6,304,891 | B1 | 10/2001 | Anderson et al. |
| 6,567,840 | B1 * | 5/2003 | Binns et al. ................... 718/103 |
| 6,721,714 | B1 * | 4/2004 | Baiada et al. ..................... 705/7 |
| 2007/0011035 | A1 * | 1/2007 | Yaffe ................................. 705/7 |

OTHER PUBLICATIONS

Vestal,S. "MetaH Support for Real-Time Multi-Processor Avionics" IEEE. 1997.*

* cited by examiner

*Primary Examiner* — Donald Sparks
*Assistant Examiner* — Benjamin Buss
(74) *Attorney, Agent, or Firm* — Patterson Thuente Christensen Pedersen, P.A.

(57) ABSTRACT

A method for the automatic sequencing of the specifications of a computer comprises an analysis of the specifications constituted by nodes with a simplification and distribution of these nodes into at least two types of nodes, and an assigning of these nodes in repetitive sub-cycles of processing tasks in order to obtain a substantially uniform distribution of the tasks.

17 Claims, 3 Drawing Sheets

METHOD FOR THE AUTOMATIC SEQUENCING OF THE SPECIFICATIONS OF A COMPUTER, ESPECIALLY FOR AIRCRAFT

RELATED APPLICATION

This application claims priority to French Application No. FR 05 52384 filed Jul. 29, 2005.

FIELD OF THE INVENTION

The invention relates to a method for the automatic sequencing of the specifications of a computer, especially an aircraft flight computer.

The invention can be applied in the field of computers for the uniform distribution of the different computations that the computer must make. It can be applied especially in flight control computers on board aircraft.

BACKGROUND OF THE INVENTION

In aeronautics, onboard computers have to make numerous in-flight computations in order to perform control operations. For example the primary flight control computer carries out in-flight computations pertaining to autopilot flight control operations and the secondary flight control computer performs in-flight computations pertaining to control surface control operations. These control operations must be done regularly, at intervals of varying length and often in a particular order.

These control operations are called specifications. A specification in aeronautics is made by a set of logic boards used to describe functions. Each logic board has a set of logic elements (gates, latches etc.) as well as at least one input and one output enabling an electrical or logic link with the other boards that make the specification as well as with the logic boards of neighboring specifications.

Specifications require a large number of computations. Now, in aircraft, for reasons of space requirement and thermal dissipation, the onboard computers and especially the flight control computer cannot be very powerful, i.e. they cannot have very great computation capacity. The specifications therefore need to be managed so as to make the most efficient use of the computation capacities of the computer, known as CPU capacities. In other words, it is important that the specifications should be managed so as to spread out the computations in time, so that the processing operations for a specification do not all have to be performed simultaneously by the computer. It is therefore necessary to manage these processing operations so that they are distributed in time.

To this end, these specifications need to be sequenced, i.e. they need to be divided into sequences that can be ordered and distributed in time. The sequences can then be distributed among a predetermined number of processing tasks and executed at varying intervals.

Thus, each task has a predefined period and is divided into fixed number of sequences which shall also be called cycles. Each cycle is divided into sub-cycles whose number varies as a function of the period of execution of the cycle in relation to that of a task.

Each sequence of a specification is formed by processing operations called nodes which therefore have variable iteration rates defined by their cycle.

The nodes of a specification may have variable iteration frequencies depending on the importance of the node, the precision of the function desired, etc. For example, one node of a specification may necessitate an iteration rate of 10 ms while another node may necessitate a rate of 20 or 40 ms. The node iteration rate is therefore a first constraint on the specifications.

Certain nodes of a specification must be executed in a precise order. This precise order is a second constraint on the specifications.

The specifications may also have a hardware constraint, namely a constraint related to the inputs and outputs of the nodes. Indeed, the data transmitted from one node to another may accumulate in the form of queues at one output of a node. These outputs therefore need to be managed so as to prevent the formation of excessively long queues which the computer would be incapable of processing. These hardware constraints are a third type of constraint on specifications.

FIG. 1 shows an example of a specification comprising twelve processing tasks. Each task has a 10-ms time window, i.e. it can execute computations for a maximum duration of 10 ms. In example of FIG. 1, there are twelve tasks, each taking 10 ms. This set of twelve tasks is therefore reiterated every 120 ms. Each of these tasks comprises four basic cycles. The tasks, referenced task 1, task 2, ..., task 12, each comprises four cycles C1, C2, C3 and C4. The cycles C1 to C4 have iteration rates that are different from one another. For example, the cycle C1 has a rate of 10 ms, C2 has a rate of 20 ms, C3 has a rate of 40 ms and C4 has a rate of 120 ms. The cycle C1 contains a sub-cycle. The cycle C2 contains two sub-cycles C21 and C22. It can thus be understood that the cycle C1 is reiterated in each of the tasks 1 to 12. By contrast, the cycle C2 has a two-task repetitiveness, i.e. it is executed in the task 1 then in the task 3, the task 5 etc. The sub-cycle of C2 executed in the tasks 1, 3, etc., is referenced C21. Similarly, the sub-cycle C22 is executed in the task 2 then repeated every 20 ms in the task 4, then the task 6, etc.

Each of the cycles enables a computation or a set of computations defined by nodes. Thus, the cycle C1 can execute a node A and a node B which will be repeated at the cycle C1 of each task 1 to 12. The sub-cycle C21 can execute the node C which will be reiterated at the tasks 3, 5, 7, etc. A node N, made in the sub-cycle C41 of the task 1, will be reiterated only at the task 1 of the next set of tasks. Thus, for example, between two iterations of the sub-cycle, in the task 1 and in the task 3, a sub-cycle C22 can execute different nodes, in task 2 and then in both tasks.

In this way, during a same time window, a node N is executed once in C4, while a node C is executed six times in C2. The division of the task into basic cycles having different occurrence rates makes it possible to modulate the repetitiveness of the different operations that have to be performed. This modulation of repetitiveness of the operations, and therefore of the nodes, is chosen as a function of the precision desired for operation, the importance of this operation or again the speed of reaction desired by the computer. The modulation of the refresh rate of the operations, as a function of the operations considered, thus improves the computation capacity of the computer.

At present, the sequencing of the flight control computer specifications is performed manually by operators. Indeed, in most classic aircraft, the number of nodes to be sequenced is in the range of 200 to 300. These nodes are distributed manually, by trial and error. The distribution of the nodes is therefore done according to the operator's knowledge and experience. The operator's competence alone provides for a sequencing that is more or less acceptable. Once the nodes have been distributed, the operator may, if necessary, modify this distribution of the nodes in the cycles in order to try and obtain improved balance in the tasks. However, given the complexity of the task, this has the effect of further extending the performance time of the sequencing without any certainty of improvement. It can be understood then that the sequencing of new specifications, which may comprise up to 3000 nodes, may necessitate several successive modifications on the part of the operator, i.e. several placing trials and therefore considerable time before the operator finds an acceptable sequencing.

At present, in certain aircraft, the computation capacity needed to perform the specifications is in the range of 60% to 70% of the maximum CPU load of the computer. Thus, by performing the sequencing of the specifications manually, an operator may obtain a sequencing enabling a free CPU load capacity of 30 to 40 percent. This free CPU load capacity is useful, especially to enable the addition of subsequent specifications as a function of the aircraft needs, even after the aircraft has been put into production. In other words, the operator seeks to obtain the most stable possible distribution so as to provide for the greatest possible margin of free CPU capacity. Thus, when stable sequencing is obtained, the operator may effect the validation of this sequencing and continue to develop, while keeping the already acquired sequencing without any need to revalidate the totality of the sequencing.

The CPU free load capacity is also used to provide a guarantee to the authorities that the maximum capacity of the computer will never be exceeded and that, therefore, there is no risk of a command not being executed in flight.

However, at present, aircraft builders are seeking to build ever bigger and ever more efficient aircraft to carry increasing quantities of goods and increasing numbers of passengers at lower cost but with improved comfort. With these new aircraft, the number of logic boards is increasing considerably as compared with a classic aircraft. The number of logic boards is in the range of the 2000 to 3000. It can therefore be understood that, with an operator working manually by a trial-and-error method, the sequencing of the specifications for 2000 to 3000 boards may take several days to perform. Furthermore, with this trial-and-error method, it is not certain that the operator will obtain an acceptable sequencing in the end.

SUMMARY OF THE INVENTION

The invention is aimed precisely at overcoming the drawbacks of the above-mentioned prior art. To this end, the invention proposes a method for the automatic sequencing of the specifications of the computer. This automation of the sequencing is done by analyzing the nodes of the specification, in assigning a priority level to the type of node and then placing these nodes in cycles of processing tasks as a function of their priority level.

The automatic performance of a sequencing operation enables acceptable sequencing to be achieved at high-speed and, if necessary, enables the modification of certain choices of criteria and parameters in order to determine the optimum sequencing for the computer.

More specifically, the invention relates to a method for the automatic sequencing of the specifications of a computer, wherein the method comprises:
  an analysis of the specifications constituted by nodes with a simplification and distribution of these nodes into at least two types of nodes, and
  an assigning of these nodes in repetitive sub-cycles of processing tasks in order to obtain a substantially uniform distribution of the tasks.

The invention may also comprise one or more of the following characteristics:

a priority level is assigned to each type of node.
  the nodes are distributed among three types of nodes.
  the nodes are assigned in sub-cycles, by type of node, as a function of their priority level.
  the tasks are balanced in terms of execution time, for each type of node.
  the tasks are balanced according to their hardware transmissions.
  the nodes are assigned by descending order of priority level.
  the nodes are divided into type of nodes as a function of the criteria and/or constraints of each node.
  the nodes are distributed among 12 or 24 tasks.
  the tasks all have a same preset duration.
  each sub-cycle has a predefined iteration occurrence rate in the processing tasks.
  the balancing of the nodes in the tasks is obtained by the successive placing, in descending order of a criterion value, of each node and by assigning each node to the task having the lowest value of this criterion.
  a compromise is made to balance the nodes. This compromise is defined in order to meet all the criteria required for the sequencing to the utmost extent.
  the time of execution of each node is maximized before assigning said node in a task.
  the method comprises a step for evaluation of the sequencing obtained after the assigning of all the nodes.
  the assigning of the nodes is reiterated after modification of settings and/or constraints by an operator.
  the assigning of the nodes is reiterated until the sequencing is acceptable.
  when the sequencing is acceptable, a sequencing solution is generated.

The invention also relates to a flight computer for aircraft, implementing the method described here above.

DETAILED DESCRIPTION OF EMBODIMENT OF THE INVENTION

Figure 2:
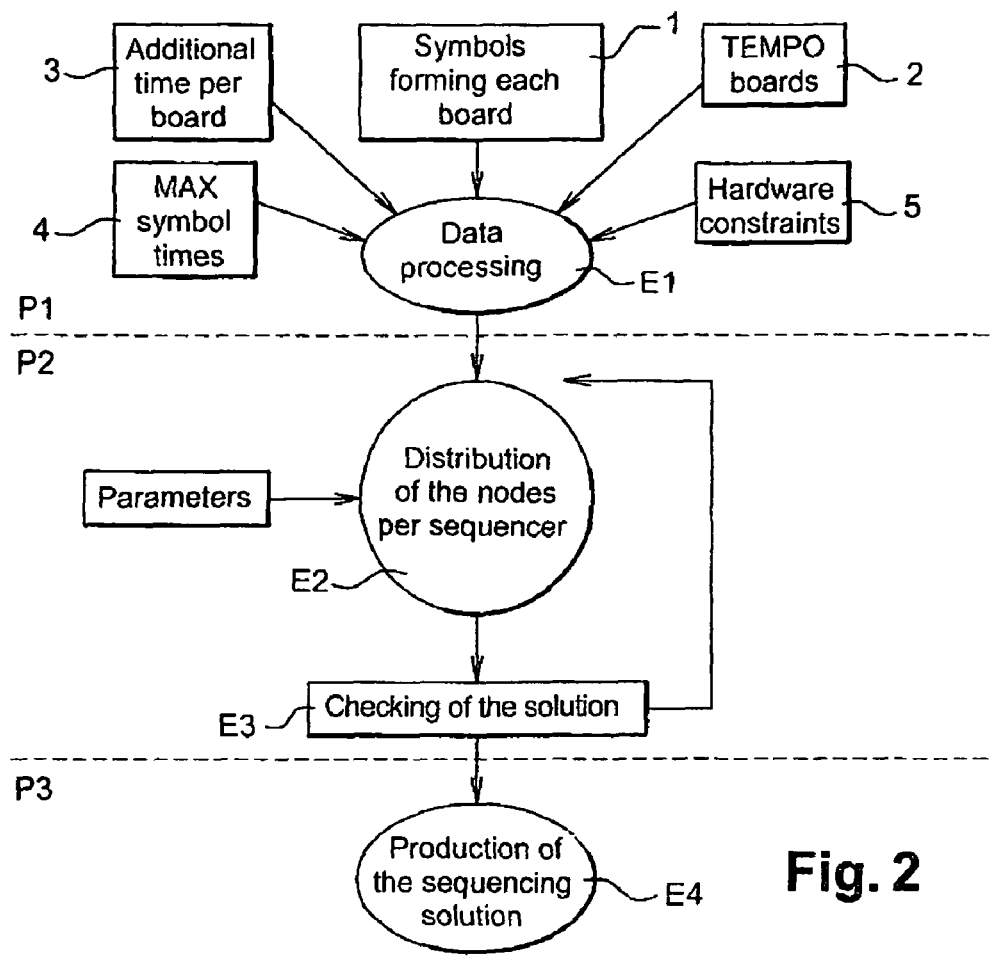
FIG. 2 is a schematic view of the general method for the production of a sequencing solution according to the invention.

FIG. 2 is a functional diagram of a general method for the production of a sequencing solution for the specifications of a flight computer, according to the invention. This method has three main phases. In a first phase P1 of the method, the operator recovers the totality of the specification to be taken into account in the sequencing solution and writes it in the form of data usable by a sequencer. The term "sequencer" designates a device used to distribute operations of processing a computer specification in order to provide sequencing that is the most homogenous possible. In other words, the sequencer is a tool used to implement the method of the invention as described in detail here below.

In a second phase P2, the sequencer analyses this information and then processes it in order to determine at least one sequencing solution.

In a third phase P3, the sequencing solution given in the phase P2 is produced, i.e. it is generated in a format that can be directly implemented in the computer of the aircraft.

The phase P1 therefore consists in bringing together all information on the specification and writing it in the form of files that can be used by the sequencer. This information includes for example nodes 1 comprising logic symbols with time constraints or execution order constraints defined by the TEMPO boards 2. There may also be information on additional times per node 3 or maximum execution times per symbol 4.

Other information on the transmission buses connected to the flight computer (known as ARINC buses) must also be taken into account by the operator during the phase P1 of the method of the invention. These pieces of information pertaining to the ARINC bus relate to the hardware resources of the computer. Indeed, the input/outputs of the computer as well as the input/outputs of the different nodes relate to activation operations contained in the nodes, requiring that these input/output elements be positioned in the tasks executed by the computer. It is important that the queues of these input/output elements should be regularly inspected, i.e. that they should be taken into account regularly so that they are not too great, at a given point in time, to be placed in a same task. The need to take account of these queues constitutes hardware constraints.

All these pieces of information constitute elements that the sequencer must analyze before being able to sequence them. In order that they may be analyzed, the operator must place these pieces of information in the form of a file that can be used by the sequencer (step E1). The format in which this file is written may be a standard format.

As explained here above, not all the specifications have the same constraints and the same data. They therefore need to be analyzed so that they can be automatically sequenced. This analysis is done by the sequencer in the step E2. This analysis consists especially in classifying and simplifying the nodes in different categories or types, as a function of predefined criteria. As shall be seen further below, these criteria may, for example, be the time of execution of the logic symbols of a node. These nodes are then classified by type of node and a priority level is assigned to each type of node.

The sequencer may then distribute or apportion the nodes among the different cycles of the processing tasks, as a function of the priority level of these nodes. The balancing of the nodes in the tasks, in terms of execution time, is therefore obtained for each type of node. This distribution of the nodes among the tasks may be done on 12 tasks, each task having a time window or time slot equal for example to 10 ms, or naturally on 24 tasks, the time slot of each task being, for example, 5 ms. This step of distribution of the nodes shall be described in greater detail here below.

When all the nodes have been distributed among the cycles of tasks, the sequencer has determined a sequencing solution. This sequencing solution takes the form of a table in which all the nodes of the specifications of the first phase are placed in slots representing the cycles of the processing tasks.

In a step E3, the sequencing solution found is checked by the operator to ascertain that it is satisfactory. If this is not so, then parameters 6 of the specifications may be modified and the step E2 of searching for a solution is started again to obtain a more satisfactory solution. It must be noted that any sequencing solution is a valid one, i.e. it is a solution acceptable to the computer. However, the solution found is not necessarily the optimum solution. The operator can therefore chose to modify certain specification elements, for example in the order constraints, and re-launch the sequencer to determine a sequencing solution that is closer to the optimum solution.

When the sequencing solution obtained is satisfactory to the operator, then this sequencing solution can be produced, in the phase P3 of the method, in a format that may vary as a function of the computer.

Figure 3:
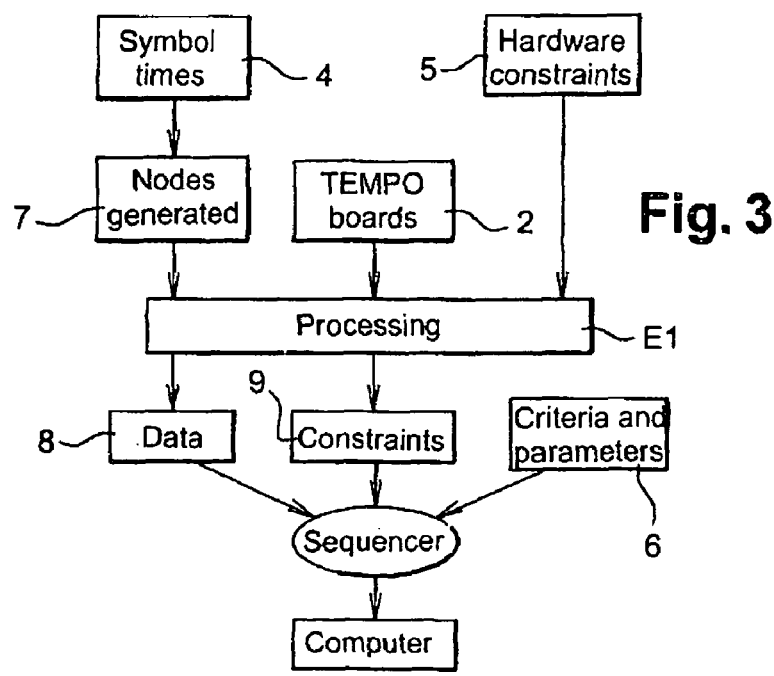
FIG. 3 is a diagram representing the analysis of the specifications in the sequencing method of the invention.

FIG. 3 shows the analysis of the different specifications and the conversion of these specifications into pieces of information usable used by the sequencer. This FIG. 3 represents the different specifications of the method, i.e. the pieces of information given by the operator at the input stage of the method. There are, in particular, the symbol times 4, the nodes 7 generated as a function of the execution time for the symbols, the TEMPO panels 2 and the hardware constraints 5.

All these pieces of information are analyzed and processed in the step E1 so as to be placed in a form exploitable by the sequencer. The processing operation E1 can be used to obtain a variety of data 8 as well as constraints 9. The pieces of data 8 correspond to the detail of the nodes, i.e. the constitution of each node (list of symbols forming each node). The constraints 9 correspond to directives on placement and occurrence rate of the nodes, i.e. to the order of execution of the cycles, and the rate of iteration of the nodes, etc.

Other pieces of information are given to the sequencer directly by the operator. These pieces of information correspond to criteria and parameters 6 on the settings of the sequencer. These settings relate especially to the formalizing of the criteria (threshold on constraints, choice of the constraints to be taken into account with a certain level of priority) and the mode of operation of the sequencer. Indeed, the sequencer may work automatically with the purpose of finding a solution as speedily as possible. In this mode, the sequencer seeks to determine a single solution, whether optimal or not, The sequencer stops making its searches as soon as the constraints are complied with. The sequencer may also work in temporal mode. In this mode, the sequencer has a limited amount of time to produce a solution. If the sequencer cannot produce a sequencing solution in this limited time, then it informs the operator that one or more criteria cannot be met. The sequencer may specify the constraint or constraints that have not been met. It may, as an indication, even give a value that is right in order to meet this constraint. The operator can then choose to modify the constraints in following the indications of the sequencer or else modify other constraints and then re-launch the sequencer. The fact that the sequencer does not find any solution in this mode does not mean there is no solution. It means only that the operator has chosen that the sequencer should not work for too long a time and that he prefers to modify the constraints in order to obtain a speedy solution. The sequencer may also work in optimal mode. In this mode the sequencer makes a search, during an unlimited period of time, for the optimal sequencing solution, i.e. the solution by which it is possible to obtain the best balance of the processing times in all the tasks.

The pieces of data 8, constraints 9 and criteria and parameters 6 are taken into account by the sequencer to determine the sequencing solution, whether acceptable or optimal, that is compliant with the operator's choice. When the sequencing solution has been produced, it can be transmitted to the computer on board the aircraft or to a test computer used to test said sequencing solution.

In certain types of aircraft, the sequencing must take account also of the specifications pertaining to a communications network on board the aircraft. Indeed, on board certain aircraft, the local communications network or local area network enables a transmission of information between the different devices of the aircraft and especially between the different computers of the aircraft. This communications network is comparable to a deterministic Ethernet network in which the transmission of the information is almost instantaneous and therefore costs little in terms of CPU resources. However, before being sent, these pieces of information must be computed and formatted, necessitating computation time, upstream to the transmission, that is relatively lengthy as compared with said transmission. Thus, when a message has to be sent by this local area network, an execution time must be planned, upstream to the transmission, for the computations used to make and format this message. Consequently, the transmission of this message must be positioned as further away as possible in the scheduling of the specifications to preserve a maximum time for making and formatting. The taking into account of this local area network is therefore an additional constraint for the sequencing of the specifications.

Figure 4:
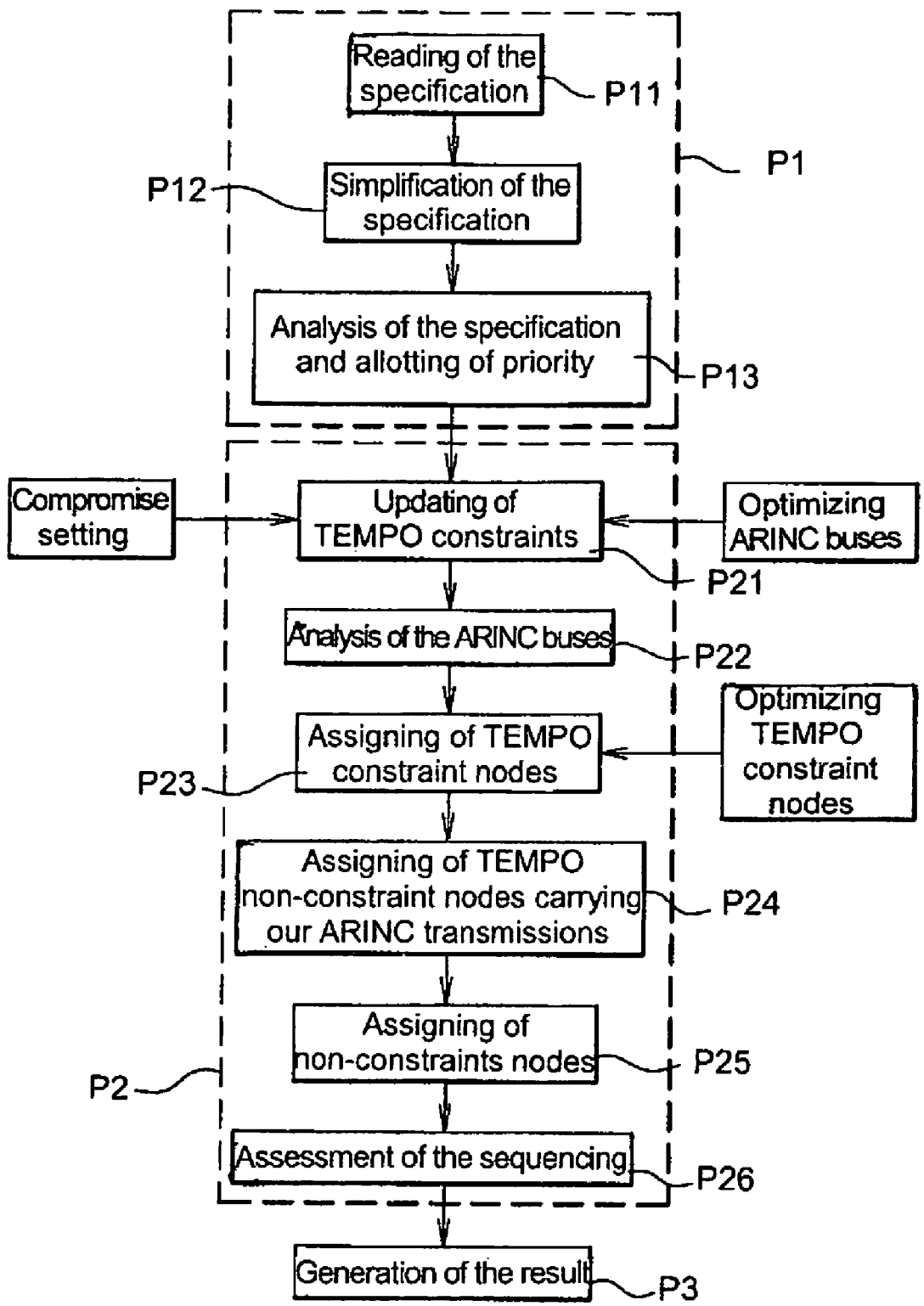
FIG. 4 is a functional diagram showing the different steps of the sequencing method of the invention.

FIG. 4 is a functional diagram showing the different steps of the method of the invention. As explained here below, certain steps of this diagram may be executed in an order different from the one shown in FIG. 4. Certain steps of this diagram may also be optional, the order and choice of the steps of the phase P2 depending on the specifications to be sequenced and the criteria chosen.

This diagram again shows the first, second and third phases of the method of the invention, respectively P1, P2 and P3. The phase P1 comprises a step P11 for reading the specifications. This reading operation consists in making a search for all the specifications to be taken into account for the sequencing, as described in FIGS. 2 and 3.

This step P11 may be followed by a step P12 of simplification of the specifications. This simplification P12 of the specifications is aimed at reducing the number of nodes when possible. In particular, the nodes which must obligatorily be executed successively, in the same sub-cycle, are grouped together in a single node. For example, if a TEMPO constraint specifies that four nodes must be executed together, one after the other, during a same sub-cycle, then the step P12 proposes to simplify this constraint in processing these four nodes as if they were only one node. The four nodes are therefore grouped together to be perceived by the sequencer as a single node.

The method of the invention continues with a step P13 for the analysis and processing of the specifications. This processing step P13, already described here above, consists in distributing the nodes by type of node and assigning a priority level to each type of node.

The second phase P2 consists in distributing all the nodes in the most balanced way possible within the tasks. To this end, each node is placed in a sub-cycle of a processing task, in taking account of the level of priority of the type of node to which the considered node belongs. Nodes of a same type are distributed successively one after the other as a function of their constraints. The distribution of the nodes is therefore done by type of node in starting with the type having the highest priority level. For example, the nodes having the highest priority level, hence those considered in the method as having the heaviest constraints, are distributed first in the different cycles of the processing tasks. When these nodes have been positioned, the nodes having an intermediate priority level are distributed in the sub-cycles, followed by the nodes having a low priority level.

In the example of FIG. 4, it is chosen to distribute first of all the nodes of the TEMPO boards and then the other nodes. In other words, it is chosen first, in the processing tasks, to balance the nodes that are TEMPO constraints, i.e. the nodes that must be made in a particular order, at particular point in time or in particular sub-cycles. Then, the nodes that are not TEMPO constraints but perform transmissions on the ARINC communications buses are distributed, and then the non-constraint nodes, i.e. the nodes whose only constraint is the execution time and for which there is therefore a far greater degree of liberty.

The phase P2, in the example of FIG. 4, comprises a TEMPO constraint updating step P21. This updating step P21 is achieved through the use, firstly, of the information R1 for setting the compromise between, on the one hand, the ARINC bus constraints and the execution time and, on the other hand, information R2 for the optimization of certain ARINC buses. The phase P2 is continued with an analysis P22 of the ARINC buses.

The phase P2 then comprises the steps P23, P24 and P25 for distribution of the nodes in the cycles of the different tasks. In the example of FIG. 4, in the step P23, the TEMPO constraint nodes are assigned first, in taking account of the information R3 for optimizing the TEMPO constraint nodes. Then, in the step P24, the nodes that are not TEMPO constraint nodes but make transmission on the ARINC buses are sent. Finally, in the step P25, the nodes that are not TEMPO constraints and perform no ARINC transmissions are assigned. Thus, in this example, the nodes have been separated into three types (TEMPO constraints, TEMPO non-constraints but with ARINC transmission and non-constraints without transmission) with three different priority levels. The highest priority level is assigned to the nodes having the most constraints, namely the TEMPO constraint nodes. The intermediate priority level has been assigned to the nodes having an execution time constraint and a transmission constraint. The lowest priority level has been assigned to nodes having only an execution time constraint.

When all the nodes have been assigned, the method continues with a step P26 for an assessment of the sequencing solution obtained. If the sequencing solution is acceptable to the operator, then this sequencing solution is generated in the phase P3. If the sequencing solution is deemed to be unacceptable by the operator or if no solution is found for a limited period of time (according to the chosen mode of operation) then the operator may modify choices by intervening, in the sequencing, on the setting of the compromise between the ARINC buses and execution time, the optimization of certain ARINC buses or again the optimization of the TEMPO constraint nodes. The new sequencing solution is then evaluated at the step P26 then generated at P3, if it is acceptable to the operator.

Within the steps 23, 24 and 25, two methods of assignment may be used. The assignment of the nodes, in the cycles of the processing tasks, may be done according to a principle known as a "basic" principle enabling especially the assignment of the TEMPO non-constraint nodes. According to this basic principle, the nodes are balanced so as to minimize only one criterion; they are processed successively, in descending order of the value of their criterion. Each node is assigned to the cycle having the lowest value of the criterion. For example, if we consider the execution time as a criterion of assignment for the following nodes:

node N1: execution time=10 µs
node N2: execution time=1 µs
node N3: execution time=5 µs
node N4: execution time=15 µs
node N5: execution time=30 µs.

In a sequencing operation where it would be sought to balance these nodes between two tasks, the nodes would be processed successively in the descending order of their execution time, i.e. first of all N5, then N4, N1, N3, and N2. In assigning a node to the least encumbered task, in keeping to the above-defined order of the nodes, first of all the node N5 is placed in the task 2, then the node N4 in the task 1, the node N1 in the task 1, the node N3 in the task 1 and the node N2 in the task 2. For the task 1, a time of 30 μs is obtained and for the task 2, a time of 31 μs is obtained.

It will be understood that the order in which the nodes are processed greatly affects the balance of the tasks. For example, if the nodes were to be processed in alphanumeric order, then the sequencing obtained would be: N2, N3 and N4 for the task 1, and N1 and N5 for the task 2. The task 1 would have a time of 21 μs while the task 2 would have a time of 40 μs. The execution times per task would therefore not be balanced.

This basic principle is applied preferably for nodes which have only one minimization criterion or assigning criterion, in particular the TEMPO non-constraint nodes. In the case of nodes having transmissions toward an ARINC bus, the minimization criterion may be other than the execution time since it relates to the number of transmissions towards this bus. It will therefore be understood that, with this basic principle, the criterion of minimization may vary as a function of the type of node. For TEMPO non-constraint nodes that do not carry out any ARINC transmissions, the minimization criterion is the maximum execution time. For TEMPO non-constraint nodes that carry out ARINCO transmissions, the minimization criterion is the number of transmissions towards the communications bus.

In the case of the TEMPO constraint nodes, there may be several minimization criteria for a same type of node. In this case, the assigning of the nodes must be done according to a principle called the derivative principle. These criteria may include the execution time, the ARINC transmissions, the difference relative to another sequencing etc. Indeed, because of the constraints defined in the TEMPO boards, it is not possible to assign a node to a given task solely as a function of a criterion to be minimized. In the derivative principle it is sought to optimize the subdivision of each TEMPO board. In other words, in this case, the method looks for the node from which it is necessary to change a sub-cycle to obtain a sequencing that is balanced at the temporal level.

In this case, the TEMPO boards are processed successively, one after the other, for example in alphanumeric order. For each of these boards, the boundaries between the different cycles are determined. It must be noted that the distribution found depends greatly on the order in which the TEMPO boards have been taken into account. To meet the constraints defined in the TEMPO boards, for each node, a list of possible sub-cycles is defined. Thus, at the outset, all the sub-cycles are permitted, and then as and when the nodes are assigned, this list is updated so as to keep to the order of the nodes. The nodes are split as a function of the sub-cycle chosen to place the node. For example, for a cycle C2, the node or nodes are split up into two groups.

In taking account of these two principles, namely the basic allocation principle and the derived allocation principle, the nodes of a specification are assigned as follows:
  the TEMPO constraint nodes that make no transmission and whose assignment is allotted by the derived principle, with the maximum execution time criterion,
  the transmission-making TEMPO constraint nodes whose assignment is allotted by the derived principle, with the maximum execution time criterion,
  the TEMPO non-constraint nodes that make no transmission and whose assignment is allotted by the basic principle, with the maximum execution time criterion, and
  the TEMPO non-constraint nodes that make no transmission and whose assignment is allotted by the basic principle, with the transmission bus criterion.

To obtain the most balanced possible distribution, i.e. an optimum distribution in a minimum execution time, it is possible to optimize the ARINC buses. Only the TEMPO constraint nodes making ARINC transmissions are concerned by this optimization. To this end, it is sought to balance only the nodes making transmissions towards the ARINC bus, chosen by achieving the maximum modernization of the distribution of these buses. When several assignments are equivalent, the assignment that enables the homogenizing of the maximum execution time is chosen. Thus, one of the best possible modes of distribution of the ARINC bus is found. Then, to take account of this distribution during the balancing of the TEMPO nodes, sub-cycle constraints are added for these nodes. These cycle constraints are added in the TEMPO boards.

To improve the distribution of the ARINC buses, it is also possible to choose to optimize the TEMPO boards. This principle of optimization of the TEMPO boards is used to obtain the order in which said boards must be processed with the derived principle in order to obtain the best possible distribution of the maximum execution time intervals. This order has an influence on the distribution for several reasons:
  it is not possible to split up a node into two parts where the first part of the node might be executed in one task and then the second part in another task.
  the TEMPO boards possess sets of indivisible nodes, i.e. these nodes must be obligatorily executed in a same task.
  the nodes must be executed in the order defined in the TEMPO boards. Thus, because of the very nature of the TEMPO boards and the constraints induced by these boards, this order has an impact on the distribution found. A simple method to find this order lies in evaluating all the orders and then determining the one that has given the best distribution.

However, in optimizing an ARINC bus, TEMPO nodes are constrained to obtain a better assignment of this bus. Now, these new constraints have impacts on the distribution of the maximum execution time intervals. Thus, improving the distribution of the transmissions of the ARINC buses causes deterioration in the distribution of the maximum execution time intervals. To limit these effects of the optimization of the ARINC buses, it is possible to make a compromise between the distribution of the time and the ARINC distribution. To this end, it is sought to improve the determining of the new constraints on the TEMPO nodes or prohibit the giving of certain values to these nodes. Thus, for example, a TEMPO constraint node which should be situated in the sub-cycle C21 to gain an efficient distribution of the time intervals may, in the worst case, be located in the sub-cycle C22 if that improves the distribution of the ARINC buses; but placing this node in cycles other than C21 or C22 is prohibited in order to prevent the imbalance created from excessively penalizing the homogeneity of the maximum execution time intervals. The excluded values depend on the compromise chosen.

Figure 1:
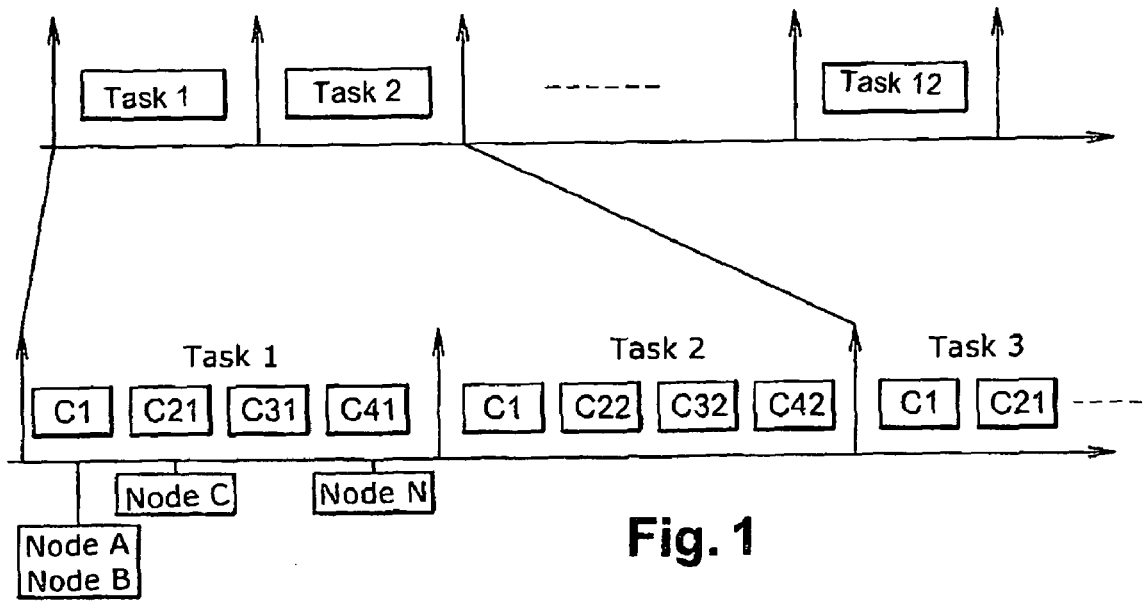
FIG. 1, which has already been described, represents a set of tasks of a specification for a flight control computer.
Figure 5:
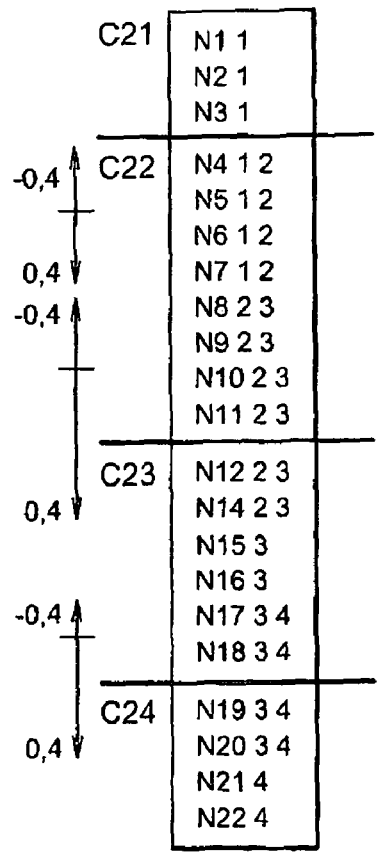
FIG. 5 gives a view, in the form of a table, of an example of a compromise of criteria in the method of the invention.

The compromise is determined from a value chosen between 0 and 0.5. A value −1 means that no compromise is chosen and, therefore, that no value is excluded. This has the effect of optimizing the ARINC buses to the maximum extent. More specifically, this value determines a field in which the boundaries between two cycles may vary. The value of the compromise is actually a percentage by which it is possible to determine a zone on the basis of the ideal cycle execution time. In the example of FIG. 5, the boundary between the first and second cycles varies between the node of the sub-cycle C21 placed at 60 percent in the sub-cycle C21 (40% from the end) and the node of the sub-cycle C22 placed at 40% in the sub-cycle C22 (40% from the start). This compromise value makes it possible to specify the extent to which there is willingness to impair the ideal distribution of the nodes for the maximum execution time criterion in order to obtain a distribution of the ARINC buses that meets hardware constraints.

What is claimed is:

1. A flight computer for aircraft, implementing a method for generating a solution for sequencing specifications of an aircraft computer, wherein the method comprises:
   automatically analyzing specifications defined by a plurality of nodes to simplify and classify the nodes into a plurality of node types, wherein a node is classified into a node type as a function of one or more criteria, a constraint, or both;
   automatically assigning the nodes as a function of the node type in repetitive sub-cycles of processing tasks in order to obtain a uniform distribution of the tasks, wherein node types having a single criterion and no constraints are assigned using a basic principle in which the nodes are balanced across tasks so as to minimize the single criterion by assigning the node to the task having a lowest value of the criterion, and wherein node types having a constraint are assigned using a derivative principle in which the nodes are balanced across tasks such that more than one criterion is minimized; and
   automatically obtaining a sequencing solution, wherein an acceptable free load capacity of a computer processing unit of the flight computer is obtained.

2. The flight computer according to claim 1, wherein during the analysis of the specifications, a priority level is assigned to each type of node.

3. The flight computer according to claim 2, wherein the nodes are assigned in sub-cycles, by type of node, as a function of their priority level.

4. The flight computer according to claim 3, wherein the tasks are balanced in terms of execution time, for each type of node.

5. The flight computer according to claim 3, wherein the tasks are balanced according to their hardware transmissions.

6. The flight computer according to claim 3, wherein the nodes are assigned by descending order of priority level.

7. The flight computer method according to claim 4, wherein the balancing of the nodes in the tasks is obtained by successively placing each node in descending order of a criterion value and by assigning each node to the task having the lowest value of this criterion.

8. The flight computer according to claim 7, wherein a compromise is made to balance the nodes.

9. The flight computer according to claim 1, wherein the nodes are distributed among three types of nodes, the three types of nodes including—
   high priority nodes having constraints in which the nodes must be in a particular order, at a particular point in time, or in particular sub-cycles;
   intermediate priority nodes defined as nodes having no constraints, and adapted to perform transmissions on communication buses of the flight computer; and
   low priority nodes defined as nodes having no constraints and no transmissions.

10. The flight computer according to claim 1, wherein the nodes are distributed among 12 or 24 tasks.

11. The flight computer according to claim 1, wherein the tasks all have a same preset duration.

12. The flight computer according to claim 1, wherein each sub-cycle has a predefined iteration occurrence rate in the processing tasks.

13. The flight computer according to claim 1, wherein the time of execution of each node is maximized before assigning said node in a task.

14. The flight computer to claim 1, wherein the method comprises a manual checking operation consisting in evaluating the sequencing solution obtained and, if this solution is not satisfactory, in reiterating the assigning of the nodes after modification of settings and/or constraints by an operator.

15. The flight computer according to claim 14, wherein the assignment of the nodes is reiterated until the sequencing solution is acceptable.

16. The flight computer according to claim 14 wherein, when the sequencing solution is acceptable, the sequencing solution is generated.

17. The flight computer according to claim 1, wherein the one or more criteria comprises node execution time, a number of transmissions towards the communications bus, and combinations thereof.

* * * * *